Nov. 17, 1925.
P. MOSIER
CART
Filed Feb. 12, 1925
1,561,658
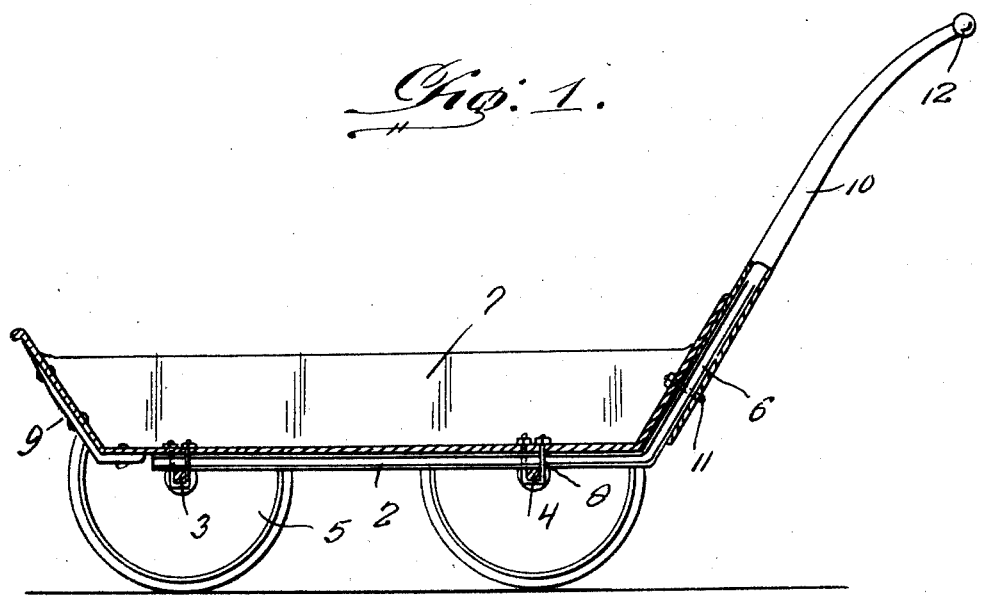
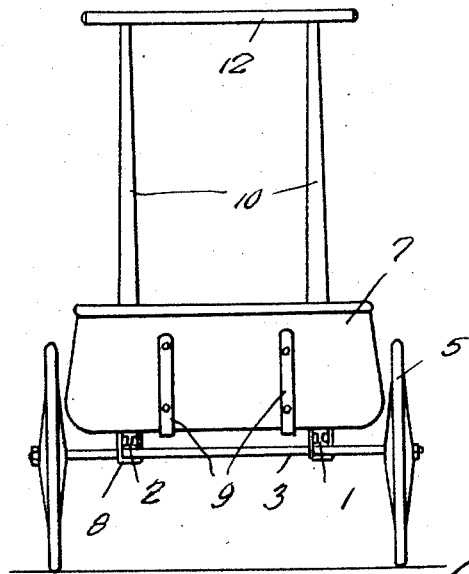
Inventor
Peter Mosier,
By
Attorney Patented Nov. 17, 1925.

1,561,658

UNITED STATES PATENT OFFICE.

PETER MOSIER, OF GRAND RAPIDS, MICHIGAN.

CART.

Application filed February 12, 1925. Serial No. 8,792.

*To all whom it may concern:*

Be it known that I, PETER MOSIER, a citizen of the United States, residing at Grand Rapids, in the county of Kent and State of Michigan, have invented certain new and useful Improvements in a Cart, of which the following is a specification.

This invention relates to improvements in wheeled carriers and is more particularly adapted to a cart wherein the same includes a relatively shallow body in which may be placed the articles of merchandise to be transported, means being further provided whereby the cart may be steered by hand.

A further object is to provide a cart of the above mentioned character, which is simple in construction inexpensive, and further adapted for the purposes for which the same is designed.

Other objects and advantages of this invention will become apparent during the course of the following description.

In the accompanying drawing forming part of this specification, and in which like numerals designate like parts throughout the same:

Figure 1 is a longitudinal sectional view through the cart embodying my invention, and Fig. 2 is a front elevation thereof.

In the drawing wherein for the purpose of illustration is shown the preferred embodiment of my invention, the numerals 1 and 2 designate a pair of elongated I-beams, the same being arranged in parallel spaced relation with respect to each other. Extending transversely across the parallel spaced I-beams are a front and rear axle 3 and 4 respectively.

Ground engaging wheels of any well known construction are secured on the respective ends of each of the axles as illustrated at 5.

The rear end of the I-beams are disposed upwardly at an incline as illustrated at 6 with reference particularly to Fig. 1, and the purpose of this construction will be presently apparent.

A relatively long and shallow body designated generally by the numeral 7 is supported on the parallel spaced I-beams and is secured thereon by the substantially U-shaped clamping bolts 8, the latter extending around the respective axles in the manner clearly illustrated in the drawing.

The forward and rear ends of the shallow body 7 are also inclined upwardly so that the upper portion of the body is of relatively greater length than the bottom thereof. Suitable reinforcing bars or strips such as is illustrated at 9 are provided on the forward end of the body 7 and provide a means for protecting the forward end of the body against coming in contact with any sharp object.

A pair of tubular handle bars 10 are slidably disposed over the rear upwardly inclined ends 6 of the respective I-beams and for holding the lower portions of the handle bars in proper adjusted relation with respect to the rear ends of the I-beams, there is provided the U-shaped clamping bolt such as is illustrated at 11. The clamping means associated with the lower ends of the tubular handle bars and the upwardly inclined rear ends of the I-beams extends through the inclined rear end of the body as is illustrated in Fig. 1.

The tubular handle bars 6 gradually taper toward their upper ends and are slightly curved rearwardly. A handle 12 is supported transversely across the upper ends of the handle bars and provides a means whereby a person may readily and easily steer the cart along the ground.

The provision of a cart of the above mentioned character, enables the same to be used for various purposes such as the carrying of merchandise as well as luggage and the like.

The provision of a cart of the above mentioned character, will enable various articles to be transported with considerable ease as well as saving considerable time and labor in the carrying of such articles.

When approaching a curb, the reinforcing strip 9 will prevent the sharp edge of the curb from coming in contact with the forward end of the body. Furthermore a cart of the above mentioned character may be readily moved over a curb without any danger of the contents of the body being spilled.

While I have shown the preferred embodiment of my invention, it is to be understood that various changes in the size, shape and arrangement of parts may be resorted to without departing from the spirit of the invention and the scope of the appended claim.

Having thus described my invention, what I claim as new is:—

A cart of the class described comprising a pair of parallel spaced I-beams, front and rear axles supported transversely across said beams, ground engaging wheels on the ends of the axles, an elongated shallow body supported on said beams, the forward and rear ends of the body being inclined upwardly, the rear ends of the I-beams being inclined upwardly and spaced slightly from the upwardly inclined rear end of the body, tubular handle bars having their lower ends disposed over the upwardly inclined rear ends of the I-beams, and a substantially U-shaped clamp encircling the lower portion of each of the tubular handle bars and extending through the upwardly inclined rear portion of the body for adjustably securing the handle bars on the upwardly inclined rear ends of the I-beams, and a handle extending across the upper ends of the handle bars.

In testimony whereof I affix my signature.

PETER MOSIER.